Dec. 15, 1959    J. W. ANDERSON    2,916,760

CONNECTOR FOR A WINDSHIELD WIPER ARM UNIT

Filed Jan. 3, 1955

INVENTOR.
JOHN W. ANDERSON
BY
Charles S. Penfold
ATTORNEY

United States Patent Office 2,916,760
Patented Dec. 15, 1959

2,916,760

CONNECTOR FOR A WINDSHIELD WIPER ARM UNIT

John W. Anderson, Gary, Ind.

Application January 3, 1955, Serial No. 479,292

9 Claims. (Cl. 15—250)

This invention relates generally to windshield wiper devices and more particularly is directed to a connector for establishing a connection between a wiper arm unit and a fitting carried by a wiper blade unit.

The invention is primarily directed to improved means for securing a connector to a wiper arm unit. More specifically, the connector includes a housing or channel member provided with yieldable locking means having abutment means which interlock with abutment means on the wiper arm unit. The yieldable locking means is preferably in the form of a spring and an opening therein and a projection or lug on the arm constitute the aforesaid abutment means.

An important object of the invention is to provide a unique way or method of attaching the connector spring to the channel member without the aid of special equipment or tools.

A specific object of the invention is to provide a connector spring of generally U-shape to form a pair of legs which straddle the wiper arm and wherein one leg is bowed and provided with the opening above referred to for receiving the projection on the arm, and the other leg serves to conceal that portion of the arm disposed in the spring.

Another object of the invention is to provide the channel member with spaced abutment means which respectively cooperate with the legs of the spring to hold the spring and member assembled after the spring is inserted into the member and contracted to place it under compression.

A further object of the invention is to provide a positive, durable and permanent connection between the connector and wiper arm and an arrangement in which the connector is held against rockable movement with respect to the arm.

Other objects and advantages of the invention will become apparent after the description hereinafter set forth is considered in conjunction with the drawings annexed hereto.

Figure 1:
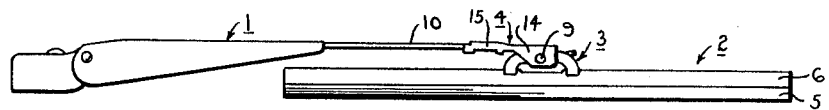
Figure 1 is an elevational view, showing the connector embodying the invention as applied to a wiper arm unit and a fitting carried by a wiper blade unit.

Referring to the drawings, numeral 1 generally designates a wiper arm unit, 2 a wiper blade unit provided with a fitting 3, and a connector 4 embodying the invention.

The blade unit 2 includes, a resilient wiping element 5 and a support 6 for the element. The fitting 3 comprises a housing provided with fingers which are preferably directly connected to the wiper element for resilient and rockable support thereon and a latch 7 having portions preferably disposed between the support 6 and the element for resilient and rockable support on the latter. The housing is also provided with a recess 8 which receives a cross-pin 9 on the connector 4 and the latch serves to detachably secure the cross-pin in the recess as clearly depicted in Figure 2.

The wiper arm unit 1 has an inner shaft engaging section for connection with a drive shaft and an outer pivotal assembly having an entering portion 10, preferably rectangular in cross-section, provided with a cylindrical projection 11 pressed outwardly at right angles from the flat upper side of said end portion.

The connector 4 includes an elongated channel member or housing 12, resilient means in the form of a generally U-shaped spring 13 preferably made from flat strip material, and the cross-pin 9 above referred to. The channel has a large extremity having side walls 14 which carry the cross-pin and straddle the fitting 3 on the blade unit and a smaller extremity having side walls 15 between which the spring is confined. The side walls 15 are provided with a pair of inner corresponding inturned fingers 16 constituting abutments engaged by the spring, and a pair of similar fingers 17 longitudinally spaced from the pair 16 and located adjacent the free end of the smaller extremity of the channel. The base wall of the channel includes a flat portion 18 joining the side walls 14 of the larger extremity, a flat portion 19 joining the side walls 15 and located in a plane parallel to the other flat portion 18, and an inclined portion 20 joining the flat portions. The flat portion 19 is preferably deformed to provide a pair of corresponding inset stop portions 21 forming an entrance opening 22 to assist in piloting the projection 11 on the arm into the connector. The portions 21 and the fingers 16, constituting abutments, serve to hold the channel and spring against relative longitudinal displacement and the fingers 16 and 17 serve to lock the spring in place.

The spring 13 includes a bowed leg portion 23 which is yieldable relative to the flat portion 19 and the inclined portion 20 of the base wall of the channel and is provided with abutment means in the form of a round opening 24 which receives the projection 11 on the arm end 10. The offsetting of portions 19 and 20 serves to provide clearance for movement of the leg 23 and the projection 11 on the arm when the latter is inserted into the spring. The spring also includes a leg portion 25 joined to the leg portion 23 by a bridge end portion 26. The leg portions are of substantially corresponding length and width for substantial nesting in the channel member. The leg 25 is provided with a pair of corresponding offset projections 27 which are located the same predetermined distance from the free end of the leg portion 23. More specifically, the length of the spring and projection 27 thereon are predetermined with respect to the location of the fingers 16 and the stop portions 21 on the channel so as to facilitate assembly or insertion of the spring into the channel.

Figure 2:
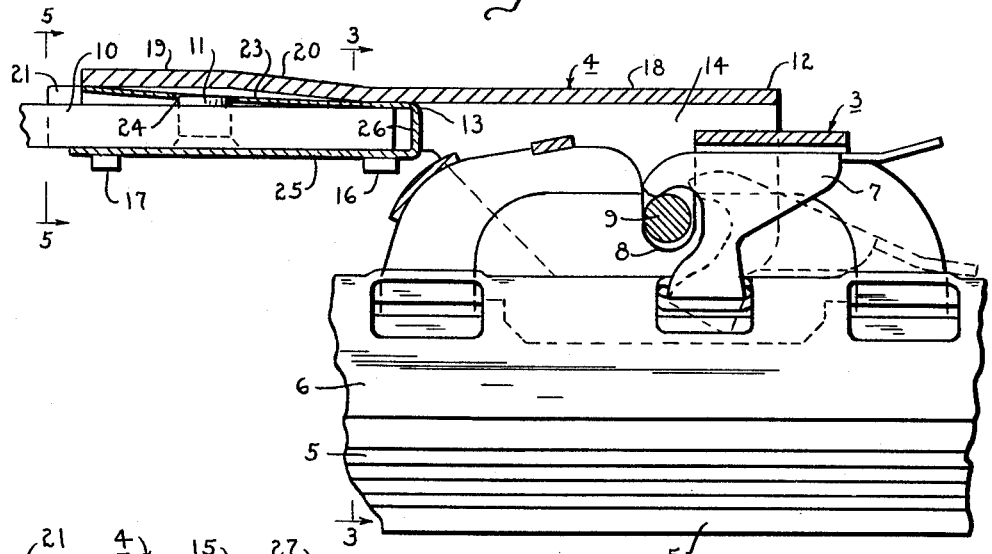
Figure 2 is an enlarged partial view of the assembly in Figure 1, with portions in section, to illustrate details of design and construction.
Figure 6:
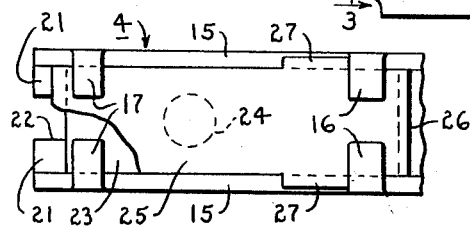
Figure 6 is a bottom view of a portion of the connector.
Figure 4:
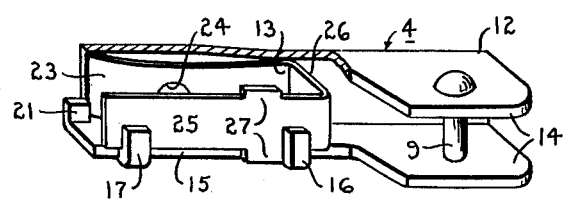
Figure 4 is a perspective view of the connector with portions in section to exemplify structural details.
Figures 3, 5:
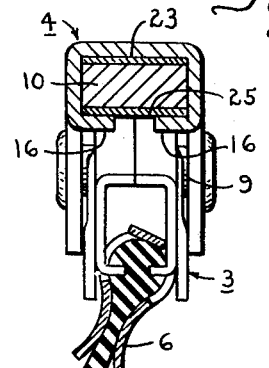
Figure 3 is a transverse sectional view taken substantially on line 3—3 of Figure 2.
Figure 5 is a transverse sectional view taken substantially on line 5—5 of Figure 2.

To assemble the spring with the channel, the legs of the spring are compressed so that the free ends of the legs can be inserted into the channel between the pairs of fingers 16 and 17 and then outwardly between the fingers 17 and the stop portions 21 a sufficient distance to permit the bridge end 26 of the spring to clear the fingers 16 in order that this end of the spring can be pressed into the channel, after which the spring is pushed backwardly under the fingers 16 until the projections 27 engage the fingers 16, whereupon the free end of the leg 23, after having slid on the stop portions 21, snap against the flat portion 19 and behind the stop portions as shown in Figures 2, 4 and 6 to prevent relative longitudinal displacement between the spring and channel. When the spring is properly located in the housing or channel it will be under compression. Although the free end of the leg 23 of the spring intimately bears against the flat portion 19 of the channel the stop portions or abutments 21 assist in preventing the end marginal edge of the arm part 10 from catching on the free end of the leg portion 23 of the spring when the part 10 is inserted into the spring or housing.

The connector can be readily connected to the arm unit by merely inserting the arm end into the spring 13 so that the projection 11 on the arm will enter the entrance opening 22 for piloting purposes and then ride on the inner surface of the bowed leg 23 of the spring to cause the leg to yield and when the projection 11 registers with the opening 24 in the leg 23 the leg will snap into a position to lock the projection in the opening. The arm end 10 is thus snugly and permanently locked in place and against vibration in the connector with the leg 25 of the spring covering the end of the arm.

Attention is directed to the fact that the abutments 16 are spaced a predetermined distance from the portion 18 of the base wall of the channel and that the abutments 17 and 21 are spaced apart a predetermined distance substantially corresponding to the distance between the abutments 16 and portion 18. The spacing between the side walls 15 of the smaller extremity of the channel housing is also predetermined. These spacings are slightly less than the thickness and width of the arm end 10 so that when the latter is inserted into the spring or housing, the arm end is substantially held against rocking or tilting. The arrangement also serves to prevent misalignment of the components.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. A connector comprising an elongate housing for receiving at one extremity an end of a windshield wiper arm provided with an abutment, resilient means secured substantially in said one extremity of the housing, said resilient means including spaced portions for receiving therebetween the said end of the arm, one of said portions being provided with an abutment disposed within the confines of the housing for interlocking engagement with the abutment on the arm, said housing being provided with means at its other extremity spaced longitudinally from the resilient means for detachably connecting it to a fitting on a wiper blade.

2. A connector comprising a housing provided with means for detachably connecting it to connection means on a wiper blade, and spring means carried by the housing and having portions for straddling a windshield wiper arm part provided with a projection, said spring means having abutment means for engaging the projection for holding the connector assembled with the arm part after the part is inserted into the spring means.

3. A connector of the kind described comprising a channeled housing having a base wall provided with abutment means and side walls provided with inturned abutment means spaced longitudinally from the abutment means on the base wall, and an elongate spring seated in the housing and formed with a pair of legs between which a windshield wiper arm part is adapted to be disposed, the legs of said spring respectively cooperating with the abutment means for limiting relative longitudinal movement between the housing and spring, one of said abutment means also serving as means assisting to guide the arm part between the legs of the spring.

4. A connector for a windshield wiper comprising an elongate housing having a large extremity provided with means for attaching the connector to a fitting and a small extremity provided with longitudinally spaced abutments, and an elongate spring disposed in the small extremity of the housing and having portions engaging the abutments to hold the spring against longitudinal movement with respect to the housing, said spring also having portions for straddling an entering part adapted for insertion into the small extremity of the housing.

5. A connector assembly for a windshield wiper comprising a housing having a base wall and side walls, said side walls being spaced apart a predetermined distance, abutment means provided adjacent the base wall and abutment means carried by the side walls and spaced a predetermined distance from the abutment means adjacent the base wall, resilient locking means carried by the housing and caught between the abutment means, an entering part disposed in the housing, means on the entering part and means on the resilient locking means interlocking with one another to lock the entering part in the housing, the width of the entering part and its thickness being respectively slightly less than the space between the side walls and the space between the abutment means so as to substantially prevent a rocking or tilting movement between the entering part and connector, and means carried by the housing spaced longitudinally from the resilient locking means for attaching the connector to a fitting.

6. In a connector of the class described, means for attachment to a windshield wiper blade assembly, a longitudinally disposed channel, carrying means for receiving in closely embracing relationship opposing surfaces of the end portion of a windshield wiper arm when said end portion is inserted in said channel to substantially prevent the connector from tilting with respect to said end portion, and resiliently reactive abutment means carried by said connector at a location spaced longitudinally from the attachment means and so disposed as to be displaced by a projecting member carried by said end portion of said windshield wiper arm while said end portion is in process of being inserted in the connector, said abutment means being disposed to move into position to prevent the ready manual removal of said connector from said arm after said arm has reached a predetermined locking position in the connector.

7. A connector of the kind described comprising an elongate member having means at one extremity for attachment with a fitting on a wiper blade and a channel formation at its other extremity for receiving an entering part of a wiper arm having a projection thereon, said channel formation having a base wall and side walls, said base wall having an offset portion forming a space and said side walls having overlapping means, said formation also being provided with abutment means and an entrance passage for the projection, and a generally U-shaped spring disposed in the channel formation and having one leg engaging the base wall and the abutment means and a second leg engaged by said overlapping means for preventing relative longitudinal movement between the member and spring and holding the spring in said formation, said first leg having a yieldable portion provided with an opening, the arrangement being such that after the entering part is inserted into the channel formation between the legs of the spring the projection on the part enters the passage and engages the yieldable portion of the one leg and urges it into the space formed by the offset portion so that the projection can be received in the opening.

8. A connector of the kind described comprising an elongate member having means at one extremity for attachment with a fitting on a wiper blade and a channel formation at its other extremity for receiving an entering part of a wiper arm having a projection thereon, said channel formation having a base wall and side walls, said base wall having an offset portion forming a space and said side walls having a pair of spaced abutments defining an entrance passage for the projection and also having a pair of longitudinally spaced inturned lugs, and a generally U-shaped spring disposed in the channel formation and having one leg engaging at least one of the abutments and a second leg engaging at least one of the lugs for preventing relative longitudinal movement between the member and spring, said lugs engaging said second leg for holding the spring in said formation, said first leg having a yieldable portion provided with an opening, the arrangement being such that after the entering part is inserted into the channel formation between the legs of the spring the projection on the part enters the passage and engages the yieldable portion of the one leg and urges it into the space formed by the offset portion as the projection is received in the opening, whereupon said yieldable portion automatically lock and positively lock the entering part in the channel formation.

9. A connector comprising a housing provided with means for detachably connecting it to a connection means on a wiper blade, and spring means carried by the housing and comprising a pair of portions for straddling a windshield wiper arm part provided with a projection, one of said spring portions having abutment means for engaging the projection for holding the connector assembled with the arm part after the part is inserted into the spring means and the other of said spring portions being disposed under the first-mentioned spring portion in a manner whereby to prevent access to the abutment means from underneath the connector.

References Cited in the file of this patent

UNITED STATES PATENTS

| | | |
|---|---|---|
| 998,390 | Pierce | July 18, 1911 |
| 2,432,693 | Anderson | Dec. 16, 1947 |
| 2,591,009 | Riche | Apr. 1, 1952 |
| 2,662,323 | Cheney | Dec. 15, 1953 |
| 2,667,657 | Sivacek | Feb. 2, 1954 |
| 2,751,620 | Ehrlich | June 26, 1956 |
| 2,807,822 | Scinta | Oct. 1, 1957 |

UNITED STATES PATENT OFFICE

CERTIFICATE OF CORRECTION

Patent No. 2,916,760            December 15, 1959

John W. Anderson

It is hereby certified that error appears in the printed specification of the above numbered patent requiring correction and that the said Letters Patent should read as corrected below.

Column 5, line 17, for "lock" read -- retracts --; line 18 for "lock" read -- locks --.

Signed and sealed this 2nd day of August 1960.

(SEAL)

Attest:
KARL H. AXLINE
Attesting Officer

ROBERT C. WATSON
Commissioner of Patents